(12) United States Patent
Dupoiron et al.

(10) Patent No.: US 6,354,333 B1
(45) Date of Patent: Mar. 12, 2002

(54) RESISTANT FLEXIBLE PIPE COMPRISING SEALING SLEEVE WITH LIMITED CREEP

(75) Inventors: François Dupoiron, Barentin; Philippe François Espinasse, Bihorel; Patrice Jung, La Mailleraye-sur-Seine, all of (FR)

(73) Assignee: Coflexip (FR)

( * ) Notice: Subject to any disclaimer, the term of this patent is extended or adjusted under 35 U.S.C. 154(b) by 0 days.

(21) Appl. No.: 09/719,448
(22) PCT Filed: Jul. 30, 1999
(86) PCT No.: PCT/FR99/01893
§ 371 Date: Dec. 12, 2000
§ 102(e) Date: Dec. 12, 2000
(87) PCT Pub. No.: WO00/09930
PCT Pub. Date: Feb. 24, 2000

(30) Foreign Application Priority Data

Aug. 10, 1998 (FR) ............................................. 98 10254

(51) Int. Cl.[7] ................................................. F16L 11/16
(52) U.S. Cl. ........................ 138/135; 138/134; 138/129; 138/133
(58) Field of Search ............................... 138/135, 134, 138/133, 129, 132, 130

(56) References Cited

U.S. PATENT DOCUMENTS

| 4,167,645 A | | 9/1979 | Carey ........................... 174/47 |
| 5,275,209 A | * | 1/1994 | Sugier et al. ................ 138/135 |
| 5,406,984 A | * | 4/1995 | Sugier et al. ................ 138/135 |
| 5,730,188 A | * | 3/1998 | Kalman et al. .............. 138/135 |
| 5,813,439 A | * | 9/1998 | Herrero et al. .......... 138/133 X |
| 6,039,083 A | * | 3/2000 | Loper ........................... 138/135 |
| 6,065,501 A | * | 5/2000 | Feret et al. .................. 138/134 |

FOREIGN PATENT DOCUMENTS

| FR | 1483914 | 9/1967 |
| FR | 2217621 | 9/1974 |
| FR | 2229913 | 12/1974 |
| FR | 2654795 | 5/1991 |
| FR | 2744511 | 8/1997 |
| WO | 9825063 | 6/1998 |

OTHER PUBLICATIONS

*Specification for Unbonded Flexible Pipe*, API Specification 17J, First Edition, Dec. 1996 Effective Date: Mar. 1, 1997, American Petroleum Institute.
*Recommended Practice for Flexible Pipe*, API Recommended Practice 17B (RP 17B), First Edition, Jun. 1, 1988, American Petroleum Institute.

* cited by examiner

Primary Examiner—Patrick Brinson
(74) Attorney, Agent, or Firm—Ostrolenk, Faber, Gerb & Soffen, LLP

(57) ABSTRACT

A tubular flexible pipe which from the inside outward includes an inner sealing sheath of polymer, a cylindrical pressure vault comprised of a helical wire winding with gaps between the windings, perhaps a wound tensile armoring layer and a scaling outer sheath. The vault includes an elongated masking element, at least partially masking the gaps between the windings of the wire and being at the inner sheath, The masking element is a wire helically coiled in a recess at the inner face of the vault or is an axial extension of the vault wire.

17 Claims, 3 Drawing Sheets

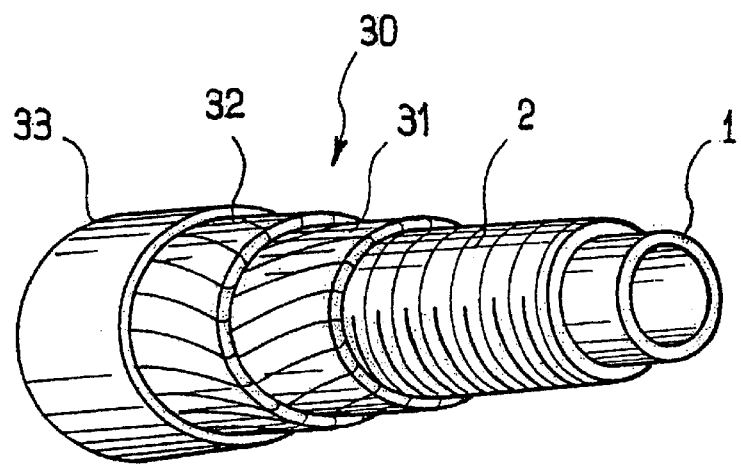
FIG_1
PRIOR ART
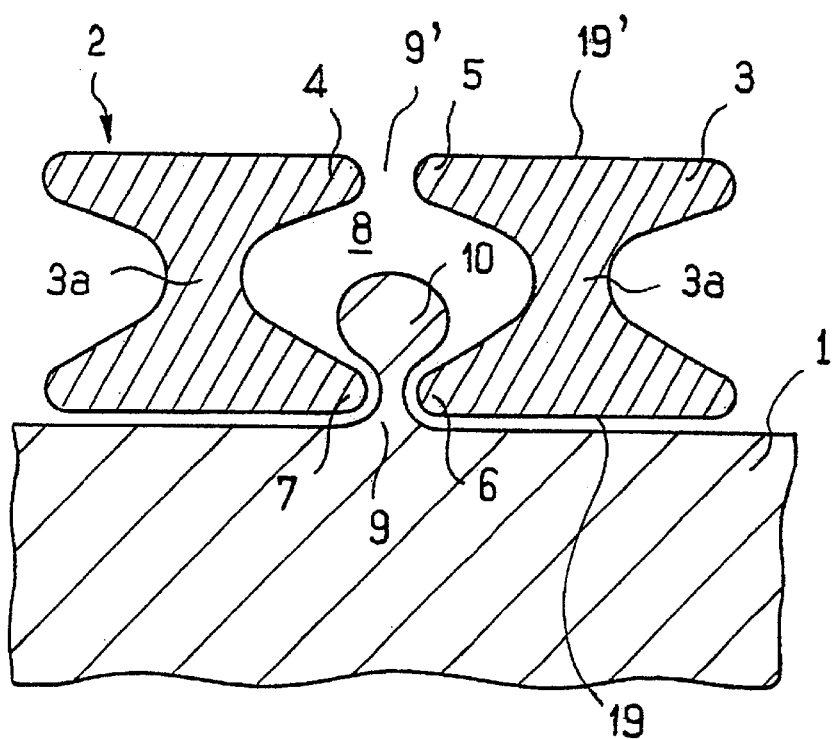
FIG_2
PRIOR ART

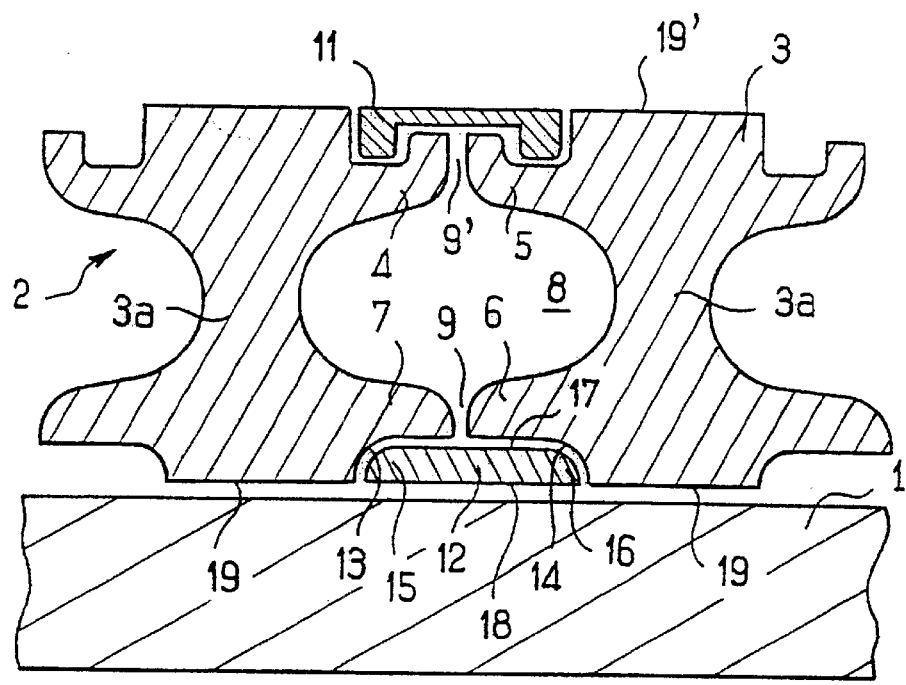
FIG_3
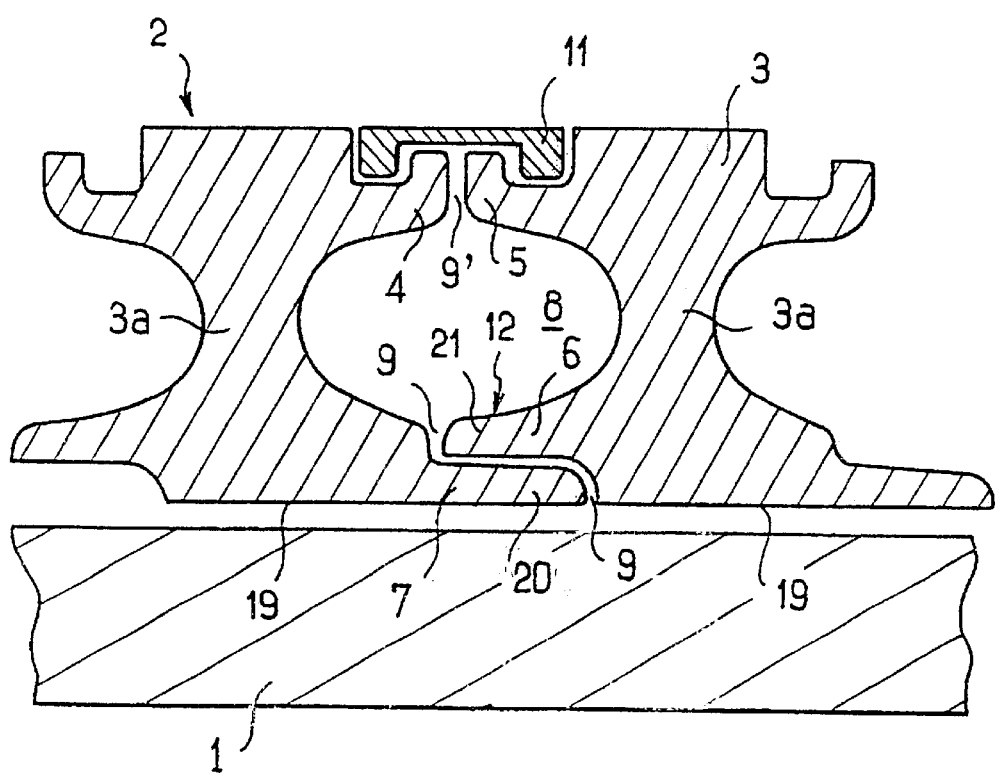
FIG_4

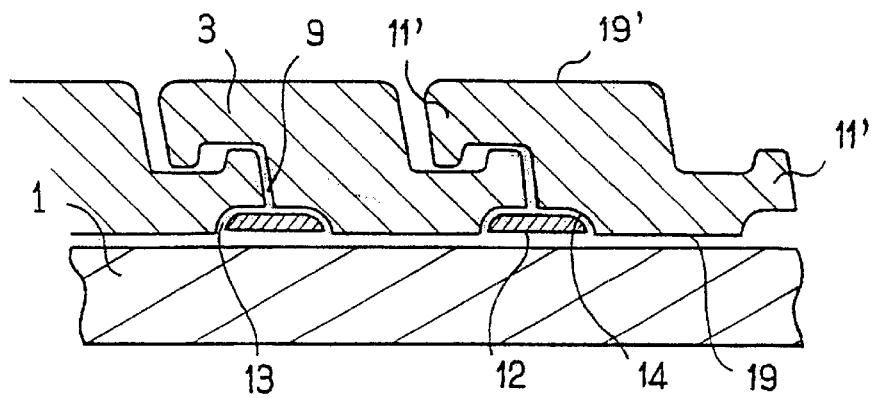
FIG_5
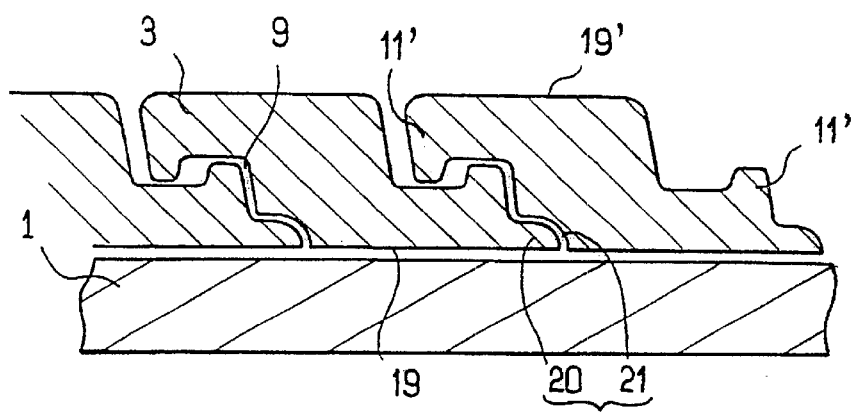
FIG_6
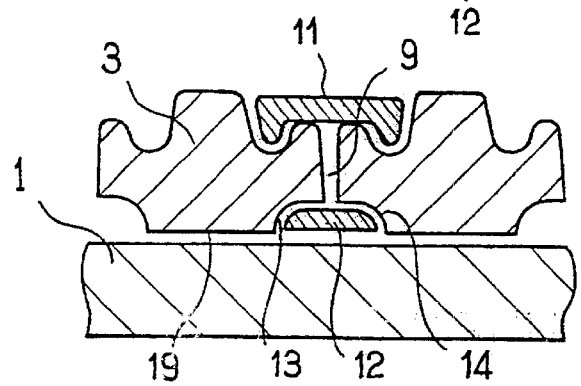
FIG_7
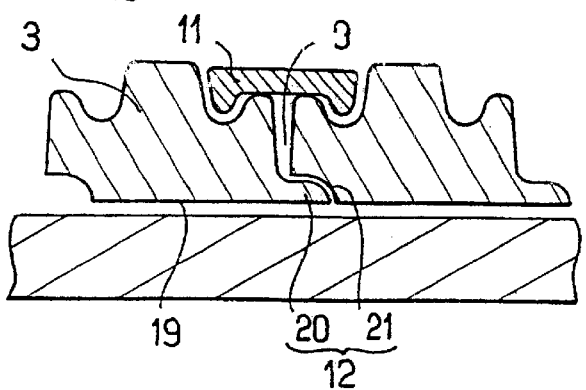
FIG_8

RESISTANT FLEXIBLE PIPE COMPRISING SEALING SLEEVE WITH LIMITED CREEP

BACKGROUND OF THE INVENTION

The present invention relates to a flexible pipe for transporting, over long distances, a fluid which is under pressure and possibly at a high temperature, such as a gas, petroleum, water or other fluids. The invention relates most particularly to a pipe intended for offshore oil exploration. It relates especially, first, to the flow lines, that is to say flexible pipes unwound from a barge in order to be laid generally on the bottom of the sea and connected to the subsea installations, such pipes working mainly in static mode, and, secondly, to the "risers", that is to say flexible pipes which are unwound from a surface installation such as a platform and are connected to the subsea installations and most of which do not lie below the seabed, such pipes working essentially in dynamic mode.

The flexible pipes used offshore must be able to resist high internal pressures and/or external pressures and also withstand longitudinal bending or twisting without the risk of being ruptured.

They have various configurations depending on their precise use but in general they satisfy the constructional criteria defined in particular in the standards API 17 B and API 17 J drawn up by the American Petroleum Institute under the title "Recommended Practice for Flexible Pipe". Reference may also be made to documents FR 2 654 795 A, WO 98/25 063 A and FR 2 744 511 A.

A flexible pipe generally comprises, from the inside outward:

an internal sealing sheath made of a plastic, generally a polymer, able to resist to a greater or lesser extent the chemical action of the fluid to be transported;

a pressure vault resistant mainly to the pressure developed by the fluid in the sealing sheath and consisting of the winding of one or more interlocked profiled metal wires (which may or may not be self-interlockable) wound in a helix with a short pitch around the internal sheath;

at least one ply (and generally at least two crossed plies) of tensile armor layers whose lay angle measured along the longitudinal axis of the pipe is less than 55° C.; and an external protective sealing sheath made of a polymer.

Such a structure is that of a pipe with a so-called smooth bore. In a pipe with a so-called rough bore, a carcass consisting of an interlocked metal strip, which serves to prevent the pipe being crushed under external pressure, is also provided inside the internal sealing sheath.

The pressure vault consists of a winding of non-touching turns so as to give the pipe a degree of flexibility. The expression "non-touching turns" is understood to mean turns between which a certain space or interstice, called hereafter "gap", is left, which gap may be greater the larger the wound profiled wire.

Due to the effect of the internal pressure and/or of the temperature developed by the fluid, the internal sealing sheath, which is relatively soft, is pressed against the internal face of the pressure vault and has a tendency to penetrate one or more inter-turn gaps. The penetration or creep tendency of the sealing sheath increases with the duration and/or the severity of the operating conditions of the flexible pipe, for example when the fluid to be conveyed flows under a high pressure (several hundred bar) and/or at a high temperature (greater than 100° C.), a high temperature generally reducing the rigidity of the internal sealing sheath. When the sealing sheath gradually penetrates the gaps, either cracks are produced, which thus affect the sealing function of the internal sheath, or even one or more local fractures of the internal sheath occur, the consequence of such incidents being an intrusion of the fluid to the outside of the internal sheath, which no longer fulfils the required sealing.

Several solutions have been proposed for limiting or trying to prevent the creep of the internal sheath into the gaps between the turns of the pressure vault, such as the choice of a thicker and/or stronger material for the sheath, but this generally results in an increase in the manufacturing cost of the pipe and often complicates its manufacture. A very advantageous solution has been proposed in document FR 2 744 511 A, which consists in winding an anti-creep tape having specific characteristics around the sealing sheath, this tape forming a sublayer lying beneath the internal face of the pressure vault, but the effectiveness of this solution encounters limitations at high pressures and for high flexible pipe diameters.

The problem associated with inter-gap creep is aggravated when the pipes used are at great depth. This is because the profiled wires used for the pressure vaults of the pipes intended for shallow and moderate depths and for small or moderate flexible pipe diameters (typically less than 12 inches, i.e. 30 cm) are of relatively small cross section and they form, after winding and interlocking, a relatively compact annular volume between its internal face and its external face, despite the presence of gaps which remain small (typically about 1 mm to 5 mm). In the case of pipes for great depths and/or of large diameter (typically greater than 30 cm), it is necessary to use a profiled wire of larger cross section having a larger moment of inertia. The gaps then increase (possibly reaching up to about 10 mm) and the solution recommended in document FR 2 744 511 A is no longer valid. To limit the weight of such a pipe for great depths, it would be desirable to be able to use sections with an H-shaped or I-shaped cross section, the moment of inertia/weight ratio of which is markedly more advantageous than for sections typically having a T-, U- or Z-shaped cross section and for variants thereof. These sections have already been proposed in the specific context of flexodrilling, for example in document FR 2 229 913 A. Such wires create, after winding, an annular vault volume which is less compact than that obtained with wires of T-, U- or Z-shaped cross section and of the same diameter; the vault is lightened, since between its internal and external faces it has a substantially confined helicoidal empty volume, bounded by the facing flanges of the wound wire and its web wound approximately radially. However, with wires of large cross section and having a large gap between non-touching turns, the presence of this volume just to the rear of the internal gap aggravates the risk of creep significantly since this volume constitutes an almost unlimited exit for the material which creeps via a gap. Within the context of flexodrilling and for a different purpose (to seal the vault), it has been proposed to fill this volume with a light elastic material, such as rubber, but this solution makes the pipe excessively rigid; this is because the rubber, which is volumetrically incompressible and confined in said helical volume of the pressure vault, is substantially undeformable and counters the flexibility of the pipe.

SUMMARY OF THE INVENTION

The problem of the creep of the internal sealing sheath of a flexible pipe suitable for great depths or for large diameters is therefore unsolved at the present time and the objective of the invention is specifically to solve it.

The present invention achieves its objective by virtue of a flexible tubular pipe of the rough-bore or smooth-bore type, that is to say comprising at least, from the inside outward, an internal sealing sheath made of a polymer material, a cylindrical pressure vault having an external face and an internal face placed over the internal sheath, the vault consisting of the winding of an interlocked metal profiled wire wound in a helix with a short pitch and with a gap between the turns, at least one ply of tensile armor layers wound with a long pitch, and an external protective sealing sheath made of a polymer, characterized in that the vault includes an elongate overlay element at least partially masking the gaps of the profiled wire facing the internal sheath. The elongate, preferably flat, overlay element is advantageously placed helically in and to the rear of the internal face of the pressure vault so as not to be projecting with respect to the annular volume of the vault. A radial confinement in terms of thickness of the gaps is therefore produced and the risk of creep of certain regions of the internal sheath into the gaps of the metal vault is minimized. It may be seen that, unlike the known anti-creep tape, which constitutes an additional layer intermediate between the sealing sheath and the pressure vault, the overlay element of the present invention is a constituent part of the vault itself and is integrated therewith, even if it may be produced in a separate form; this is because, depending on the two main embodiments of the invention, the overlay element of the invention is produced by an attached wire which is inserted into the internal face of the vault or by parts of the profiled wire itself by an overlap on the internal face of the vault.

The invention is applicable to all kinds of wire cross sections, which may or may not be self-interlockable (and in the latter case, they are interlocked by an interlocking wire). However, the profiled wire of the pressure vault advantageously has a lightened cross section in the form of an H on its side or an upright I; the web of the section is wound approximately radially and its flanges define the confined volume, access to which is prohibited by the overlay element which bars the gap on the internal face of the vault.

The invention will be more clearly understood with the aid of the description which follows, with reference to the appended schematic drawings showing, as examples, embodiments of the flexible pipe according to the invention. Further advantages and features will become apparent on reading the description.

BRIEF DESCRIPTION OF THE DRAWINGS

FIG. 1 is a schematic perspective view showing the successive layers of a pipe (in this case of the smooth-bore type) to which the invention applies.

FIG. 2 is a partial view in longitudinal section of a flexible pipe of the prior art, comprising an inner sheath which has crept into a gap in the metal vault formed from an H-shaped metal wire wound in a helix.

FIG. 3 is a partial view in longitudinal section of a first embodiment of a flexible pipe according to the invention, the metal vault being formed from an H-shaped metal wire wound in a helix and the overlay element being produced in the form of a helically wound flat wire.

FIG. 4 is a partial view in longitudinal section of a second embodiment according to the invention, the metal vault being formed from an H-shaped metal wire wound in a helix and the overlay element being made in the form of overlapping parts formed at the very base of the metal wire of the vault.

FIGS. 5 and 6 on the one hand and 7 and 8 on the other are similar to FIGS. 3 and 4, by replacing the H-shaped metal wire of the vault with a "zeta" wire and a "teta" wire, respectively.

It should be noted that FIGS. 2 to 8 are schematic partial views of pipes, the spaces between the constituent elements of which have been intentionally exaggerated in order to make the drawings clearer.

DESCRIPTION OF PREFERRED EMBODIMENTS

As FIG. 1 shows, and in general, a pipe of the smooth-bore type comprises, from the inside outward, a polymeric internal sealing sheath 1, a metal vault 2 consisting of the winding of at least one profiled metal wire wound in a helix, an armor layer 30 resistant to the axial tension in the longitudinal direction of the pipe and usually consisting of one or more pairs of crossed plies 31, 32 of a winding in opposite directions, and a polymeric external sealing sheath 33. Other layers (not shown) may be provided, depending on the type and the application of the pipe, such as, for example, an internal carcass underneath the internal sealing sheath 1 (for so-called rough-bore pipes which are the preferred type of application of the invention), a hoop reinforcement layer consisting of a winding of a rectangular wire with a short pitch, interposed between the pressure vault 2 and the first armor ply 31, and intermediate sheaths placed between various armor plies.

As shown in FIG. 2, the concern to lighten the pressure vault 2 of pipes intended to withstand high pressures and consequently using a profiled wire 3 of large cross section and therefore of large moment of inertia, leads to the use, as profiled wire, of a profiled wire having a cross section in the form of a H on its side (or an upright I) which has a web 3a and flanges 4, 5, 6 and 7, the web 3a being wound approximately radially over and around the internal sheath 1 in a helix with a short pitch, the external flanges 4, 5 and the internal flanges 6, 7 of the consecutive turns facing one another and together forming a substantially confined volume 8 helically traversing the vault 2. This figure does not show the interlocking of the wire, which is necessary however and which is achieved either by self-interlocking, by giving the profiled wire a special profile, or by an attached interlocking wire which it is preferred to place on the external face of the vault (so-called interlocking "from above") both for reasons of ease of manufacture and of better strength of the pipe, especially for its use in dynamic mode (riser). This is why FIGS. 3, 4, 7 and 8 of the invention which follow show interlocking from above.

To give the pipe flexibility, the helical winding of the metal wire 3 is done leaving internal helical gaps 9 and external helical gaps 9' on the respective internal faces 19 and external faces 19' of the pressure vault, these gaps opening on to the internal volume 8. There is a risk of the internal sheath 1 creeping between the flanges 6 and 7 of two consecutive turns facing the internal sheath 1, possibly even resulting in a portion 10 of said internal sheath 1 entering the volume 8 between the consecutive turns of the profiled metal strip 3. This is the phenomenon that the invention aims to combat.

In the embodiment shown in FIG. 3, the metal wire 3, in the form of an H on its side, of the pressure vault 2 of the flexible pipe is interlocked by a fastener 11 on the external face 19' of the vault; the fastener 11 consists of a flat U-shaped wire wound helically in recesses in the external face 19' of the vault 2, that is to say by the outer flanges 4 and 5 of the metal wire 3, and it joins together the consecutive turns of the helically wound metal wire 3 at these outer flanges 4 and 5. Advantageously, the fastener 11 is placed slightly set back with respect to the volume envelope of the external face 19' so as to prevent the armor layers from bearing on the fastener 11, which would run the risk of inducing fatigue in dynamic use.

An independent overlay element 12, consisting of a flat wire wound helicaly in the inner face 19 of the vault 2, at the inner flanges 6 and 7 of the metal wire 3, masks the internal gap 9 while being integrated in a compact manner into the metal vault 2 by means of facing recessed parts 13 and 14 made over the length of the flanges 6 and 7 of the consecutive turns on the metal wire 3 which are the furthest inside the pipe. These recessed parts 13 and 14 are substantially in shape correspondence with said overlay element 12 so that the latter, 12, can be easily housed therein, at least partially. The recesses in parts 13 and 14 extend away from the gap. It will be noted that the overly element 12 is entirely within the volume envelope of the vault 2 which bears on the inner sheath 1 via its inner face 19 consisting of the inner base of the wound section 3, so that the overlay element 12 is not compressed between said sheath 1 and the metal vault 2.

The radially outer surface 17 of the overlay element 12 facing the metal vault 2 advantageously has rounded edges 15 and 16 or has a convex shape for gentle contact with said metal wire 3 and so as to reduce the risk of said overlay element 12 being inserted into the gap 9. Moreover, the recessed parts 13 and 14 of the metal vault 2 lie facing the internal sheath 1 so as to make it easier for the overlay element 12 to be put into place by simultaneously spiraling it with the spiraling of the profiled wire 3.

Advantageously, the overlay element 12 consists of a PTFE-coated metal or of a hard plastic.

In another embodiment of the invention, also with interlocking of the vault from above, provision is made for the overlay element 12 to consist of superposed parts 20, 21 of the helically wound metal wire 3 itself, these parts extending from its inner flanges 6, 7 as shown in FIG. 4. The vault wire 3 has opposite edges and the part 20 projects from one edge and the recess 21 is in from the opposite edge and receives the part 20 from the adjacent turn. These parts 20, 21 overlap longitudinally so that they allow the formation of the longitudinal gap 9 but, on the other hand, leave virtually no passage in the thickness direction of the flanges, so as to bar access between the sheath 1 and the confined volume 8.

These two embodiments of the overlay element, in the form of an attached flat wire or of overlapping parts of the base of the profiled wire, apply to profiled-wire cross sections other than the lightening H- or I-shaped cross sections.

Thus, FIGS. 5 and 6 show the application of the invention to a zeta profiled wire 3 which is interlockable by means of its parts 11' lying generally near a mid-plane of the thickness of the wire 3. In FIG. 5, recesses 13 and 14 provided in the internal face 19 of the vault on each side of the gaps 9 make it possible to house a helically wound flat wire 12 (at a certain distance from said internal face 19). In FIG. 6, the base of the profiled wire 3 is profiled so as to form two cylindrical overlapping parts 20 and 21 which constitute the overlay element 12 barring the gap 9.

FIGS. 7 and 8 likewise show the application of the invention to a vault produced with a profiled wire 3 of teta cross section, interlocked from above, using an interlocking wire 11.

What is claimed is:
1. A flexible tubular pipe with an inside and an outside, the pipe comprising from the inside outward:
   an internal sealing sheath comprised of a polymer material;
   a cylindrical pressure vault outside the internal sheath, the pressure vault having an external face and having an internal face placed over the internal sheath; the vault comprising interlocked profiled metal wire wound in a helix with turns at a relatively short pitch, with the turns interlocked and with a gap between adjacent turns of the helix; the vault wire including a recess into the internal face and the recess extending away from the gap along the length of the wire;
   an elongate overlay element at the internal face of the vault extending in the recess along the length of the wire and not interlocking the turns of the helix;
   facing the internal sheath, the overlay element extending past and at least partially masking the gap between the adjacent turns of the helix; the recess and the overlay element being respectively so shaped that with the vault over the internal sheath, the overlay element in the recess prevents passage of the sheath between the overlay element and the wire through the recess and into the gap;
   at least one ply of tensile armor layers wound with a relatively long pitch around the external face of the vault;
   an external protective sealing sheath comprised of a polymer outside the at least one ply of tensile armor layers.

2. The pipe of claim 1, wherein the overlay element comprises a second wire wound in a helix located in the recess and at the internal sheath and masking the gap between adjacent turns of the helix.

3. The pipe of claim 1, wherein the overlay element is of an axial length along the pipe such that the overlay element overlaps one of the turns of the vault adjacent the gap masked by the overlay element.

4. The pipe of claim 1, wherein the profiled metal wire has opposite first and second edges, and the overlay element comprises a portion of the wound vault wire which projects from the first edge of the profiled metal wire and which extends axially along the sheath to the adjacent turn of the helix sufficiently to mask the gap between the adjacent turns of the helix;
   the recess extends in from the opposite second edge of the profiled metal wire so that the axially extending portion of one turn extends into the recess of the adjacent turn.

5. A flexible tubular pipe with an inside and an outside, the pipe comprising from the inside outward:
   an internal sealing sheath comprised of a polymer material;
   a cylindrical pressure vault outside the internal sheath, the pressure vault having an external face and having an internal face placed over the internal sheath; the vault comprising interlocked profiled metal wire wound in a helix with turns at a relatively short pitch and with a gap between adjacent turns of the helix;
   the vault including an elongate overlay element at the internal face of the vault facing the internal sheath and the overlay element at least partially masking the gap between the adjacent turns of the helix;
   at least one ply of tensile armor layers wound with a relatively long pitch around the external face of the vault;
   an external protective sealing sheath comprised of a polymer outside the at least one ply of tensile armor layers;
   wherein the vault wire is interlocked between adjacent turns at the external face of the vault.

6. A flexible tubular pipe with an inside and an outside, the pipe comprising from the inside outward:
- an internal sealing sheath comprised of a polymer material;
- a cylindrical pressure vault outside the internal sheath, the pressure vault having an external face and having an internal face placed over the internal sheath; the vault comprising interlocked profiled metal wire wound in a helix with turns at a relatively short pitch and with a gap between adjacent turns of the helix;
- the vault including an elongate overlay element at the internal face of the vault facing the internal sheath and the overlay element at least partially masking the gap between the adjacent turns of the helix;
- at least one ply of tensile armor layers wound with a relatively long pitch around the external face of the vault;
- an external protective sealing sheath comprised of a polymer outside the at least one ply of tensile armor layers;
- wherein the overlay element comprises a wire wound in a helix located at the internal sheath and in the gap between adjacent turns of the vault wire;
- wherein the vault wire has a cross section in the form of an H on its side or an upright I, including a web and inner and outer flanges joined by the web, and the vault wire being wound approximately radially, so that the inner and outer flanges of adjacent turns of the vault wire face each other and together form a substantially confined volume between the webs of adjacent turns;
- the overlay element wire being at least partially housed in the inner flanges of the vault wire for barring passage between the sealing sheath and the confined volume through the gap between windings.

7. The flexible pipe of claim 6, wherein the internal face of the vault has a recess defined therein in which the overlay element wire is received, and the recess faces the internal sheath.

8. The flexible pipe of claim 7, wherein the overlay element has a vault facing surface facing the vault and has edges on the vault facing surface which are rounded.

9. The flexible pipe of claim 2, wherein the overlay element has a vault facing surface facing into the vault wire recess and has edges on the vault facing surface which are rounded.

10. The flexible pipe of claim 9, wherein the overlay element has an inwardly facing side facing the internal sheath and the inwardly facing side of the overlay element does not project toward the sheath beyond the internal face of the vault.

11. The flexible pipe of claim 4, wherein the overlay element has an inwardly facing side facing the internal sheath and the inwardly facing side of the overlay element does not project toward the sheath beyond the internal face of the vault.

12. The flexible pipe of claim 2, wherein the overlay element has an inwardly facing side facing the internal sheath and the inwardly facing side of the overlay element does not project toward the sheath beyond the internal face of the vault.

13. The flexible pipe of claim 2, wherein the overlay element is comprised of PTFE coated metal or hard plastic.

14. A flexible tubular pipe with an inside and an outside, the pipe comprising from the inside outward:
- an internal sealing sheath comprised of a polymer material;
- a cylindrical pressure vault outside the internal sheath, the pressure vault having an external face and having an internal face placed over the internal sheath; the vault comprising interlocked profiled metal wire wound in a helix with turns at a relatively short pitch, with the turns interlocked and with a gap between adjacent turns of the helix; the vault wire including a recess into the internal face and the recess extending away from the gap along the length of the wire;
- an elongate overlay element at the internal face of the vault extending in the recess along the length of the wire and not interlocking the turns of the helix; facing the internal sheath, the overlay element extending past and at least partially masking the gap between the adjacent turns of the helix; the recess and the overlay element being respectively so shaped that with the vault over the internal sheath, the overlay element in the recess prevents passage of the sheath between the overlay element and the wire through the recess and into the gap.

15. The flexible pipe of claim 1, wherein the vault wire has a cross section in the form of an H on its side or an upright I, including a web and inner and outer flanges joined by the web, and the vault wire being wound approximately radially, so that the inner and outer flanges of adjacent turns of the vault wire face each other and together form a substantially confined volume between the webs of adjacent turns;
- the overlay element being at least partially housed in the inner flanges of the vault wire for barring passage between the sealing sheath and the confined volume through the gap between windings.

16. The flexible pipe of claim 15, wherein the overlay element has a vault facing surface facing the vault and has edges on the vault facing surface which are rounded;
- the overlay element has a vault facing surface facing into the vault wire recess and has edges on the vault facing surface which are rounded.

17. The flexible pipe of claim 1, wherein the recess extends axially into both opposite sides of the wire, whereby the recess extends away from both sides of the gap;
- the overlay element is wound in a helix in the recess, extends away from both sides of the gap, is at the internal sheath and masks the gap between adjacent turns of the helix.

* * * * *